United States Patent
Hale et al.

(10) Patent No.: US 10,259,572 B2
(45) Date of Patent: Apr. 16, 2019

(54) TORSIONAL ANOMALIES DETECTION SYSTEM

(71) Applicants: Rodney Keith Hale, Joshua, TX (US); Steven Kirk Spears, Hurst, TX (US); Brian Tucker, Fort Worth, TX (US)

(72) Inventors: Rodney Keith Hale, Joshua, TX (US); Steven Kirk Spears, Hurst, TX (US); Brian Tucker, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 272 days.

(21) Appl. No.: 14/688,831

(22) Filed: Apr. 16, 2015

(65) Prior Publication Data
US 2016/0304192 A1 Oct. 20, 2016

(51) Int. Cl.

| | | |
|---|---|---|
| B64C 27/00 | (2006.01) | |
| G01M 13/02 | (2006.01) | |
| G01M 15/12 | (2006.01) | |
| B64D 45/00 | (2006.01) | |
| G01M 17/007 | (2006.01) | |
| G01M 13/028 | (2019.01) | |
| G01M 13/045 | (2019.01) | |
| G01H 1/00 | (2006.01) | |
| G01M 15/04 | (2006.01) | |
| G01M 17/00 | (2006.01) | |
| G01H 11/02 | (2006.01) | |

(52) U.S. Cl.
CPC ............ B64C 27/006 (2013.01); B64D 45/00 (2013.01); G01H 1/003 (2013.01); G01M 13/028 (2013.01); G01M 13/045 (2013.01); G01M 15/042 (2013.01); G01M 15/12 (2013.01); G01M 17/00 (2013.01); G01M 17/007 (2013.01); B64D 2045/0085 (2013.01); G01H 11/02 (2013.01)

(58) Field of Classification Search
CPC ....... B64C 27/006; B64C 27/12; B64D 45/00; G01M 17/007; G01M 13/021; G01M 13/028; G01M 13/045; G01M 13/02; G01H 11/02; G01H 1/003
See application file for complete search history.

(56) References Cited

U.S. PATENT DOCUMENTS 3,712,130 A * 1/1973 Weichbrodt ........... G01H 1/003
33/501.13
4,015,466 A * 4/1977 Stick ................... G01M 15/046
377/3

(Continued)

OTHER PUBLICATIONS

J.C. Wachel, "Analysis of Torsional Vibrations in Rotating Machinery," Twenty-Second Turbomachinery Symposium, 1993, 26 pages, Engineering Dynamics Incorporated, San Antonio, Texas.

*Primary Examiner* — Helen C Kwok
(74) *Attorney, Agent, or Firm* — James E. Walton

(57) ABSTRACT

A method and apparatus for determining failure diagnosis of drive systems of rotorcrafts through measuring the spectral characteristics of rotational oscillations and torsional oscillations and steady windup of a drive shaft. Mechanical anomalies of the drive system will alter the spectral characteristics of rotational oscillations and torsional oscillations and steady windup as detected by a pair of variable reluctance sensors in conjunction with a radial grating mounted on the drive shaft.

14 Claims, 5 Drawing Sheets

(56) References Cited

U.S. PATENT DOCUMENTS

| | | | | |
|---|---|---|---|---|
| 4,213,114 A | * | 7/1980 | Cochard | G01H 1/003 340/508 |
| 4,303,882 A | | 12/1981 | Wolfinger | |
| 4,331,034 A | * | 5/1982 | Takeda | G01N 29/265 376/252 |
| 4,426,641 A | * | 1/1984 | Kurihara | G01H 1/003 340/681 |
| 4,872,337 A | * | 10/1989 | Watts | F16H 57/00 702/179 |
| 4,931,949 A | * | 6/1990 | Hernandez | G01M 13/021 340/683 |
| 5,253,531 A | | 10/1993 | Walker | |
| 5,365,787 A | * | 11/1994 | Hernandez | G01H 1/003 324/207.25 |
| 5,501,105 A | * | 3/1996 | Hernandez | G01H 1/003 324/226 |
| 5,511,422 A | * | 4/1996 | Hernandez | G01H 1/003 702/199 |
| 5,576,496 A | * | 11/1996 | Carlini | G01M 13/028 73/121 |
| 5,723,794 A | * | 3/1998 | Discenzo | G01L 1/241 73/800 |
| 5,734,108 A | * | 3/1998 | Walker | G01P 3/486 73/650 |
| 5,825,657 A | * | 10/1998 | Hernandez | G01H 1/003 702/182 |
| 6,351,714 B1 | * | 2/2002 | Birchmeier | G01M 7/025 702/145 |
| 6,895,830 B2 | * | 5/2005 | Kochersberger | G01M 13/025 340/679 |
| 7,099,782 B2 | * | 8/2006 | Hitchcock | G01H 1/003 702/56 |
| 7,167,814 B2 | * | 1/2007 | Lindberg | G01H 1/003 702/182 |
| 7,513,159 B2 | * | 4/2009 | Komeyama | F16D 3/41 73/593 |
| 7,539,549 B1 | * | 5/2009 | Discenzo | F04D 15/0077 324/765.01 |
| 8,909,453 B2 | | 12/2014 | Wendelsdorf | |
| 2005/0196090 A1 | * | 9/2005 | Maeda | F16C 19/527 384/624 |
| 2005/0284225 A1 | * | 12/2005 | Luo | F16H 57/01 73/593 |
| 2006/0236769 A1 | * | 10/2006 | Tenley | G01N 29/226 73/618 |
| 2007/0032968 A1 | * | 2/2007 | Nakamura | G01M 13/028 702/56 |
| 2008/0033695 A1 | * | 2/2008 | Sahara | G01H 1/003 702/185 |
| 2008/0234964 A1 | * | 9/2008 | Miyasaka | G01H 1/003 702/113 |
| 2008/0271537 A1 | * | 11/2008 | Panyard | G01N 29/225 73/629 |
| 2009/0151458 A1 | * | 6/2009 | Yoon | G01N 29/225 73/639 |
| 2011/0230304 A1 | * | 9/2011 | Morel | B64C 27/12 475/331 |
| 2012/0325005 A1 | * | 12/2012 | Oliver | G01M 17/10 73/637 |
| 2013/0116937 A1 | * | 5/2013 | Calhoun | G01M 13/028 702/35 |
| 2013/0184959 A1 | * | 7/2013 | Wendelsdorf | B64C 27/04 701/99 |
| 2014/0047271 A1 | * | 2/2014 | Gray | G05B 23/0251 714/25 |
| 2014/0352444 A1 | * | 12/2014 | Nicq | G01H 1/003 73/660 |
| 2015/0012247 A1 | * | 1/2015 | Bowers, III | G01N 29/46 702/189 |
| 2015/0160101 A1 | * | 6/2015 | Gao | G01M 13/028 702/6 |
| 2016/0370259 A1 | * | 12/2016 | Loverich | G01M 13/00 |
| 2018/0011065 A1 | * | 1/2018 | Bowers, III | G01N 29/50 |

\* cited by examiner

TORSIONAL ANOMALIES DETECTION SYSTEM

BACKGROUND

Technical Field

The system of the present application relates in general to the field of drive system health monitoring, and relates specifically to the drive systems rotational oscillations and torsional oscillations and steady windup and detection of mechanical anomalies indicated by these changes in rotational oscillations and torsional oscillations and steady windup of a series of drive shafts.

Description of Related Art

Typically, in rotorcrafts parts are replaced based upon the number of hours flown. Therefore, parts are inspected and replaced regularly to insure the aircraft is flightworthy. Instrumentation systems, based upon accelerometers, provide fault detection of drive trains. As the aircraft parts fail, harmonic analysis of the vibratory patterns changes and indicates a failing part. However, accelerometers must be spread out along the length of the drive train as vibrations resulting from faulty parts are generally localized to the faulty part. Accelerometers must be regularly calibrated to verify their output requiring additional maintenance.

Hence, there is a need for a method and apparatus for fault detection in a tail rotor drive shaft without accelerometers.

DESCRIPTION OF THE DRAWINGS

The novel features believed characteristic of the system of the present application are set forth in the appended claims. However, the system itself, as well as, a preferred mode of use, and further objectives and advantages thereof, will best be understood by reference to the following detailed description when read in conjunction with the accompanying drawings, wherein:

Figure 1:
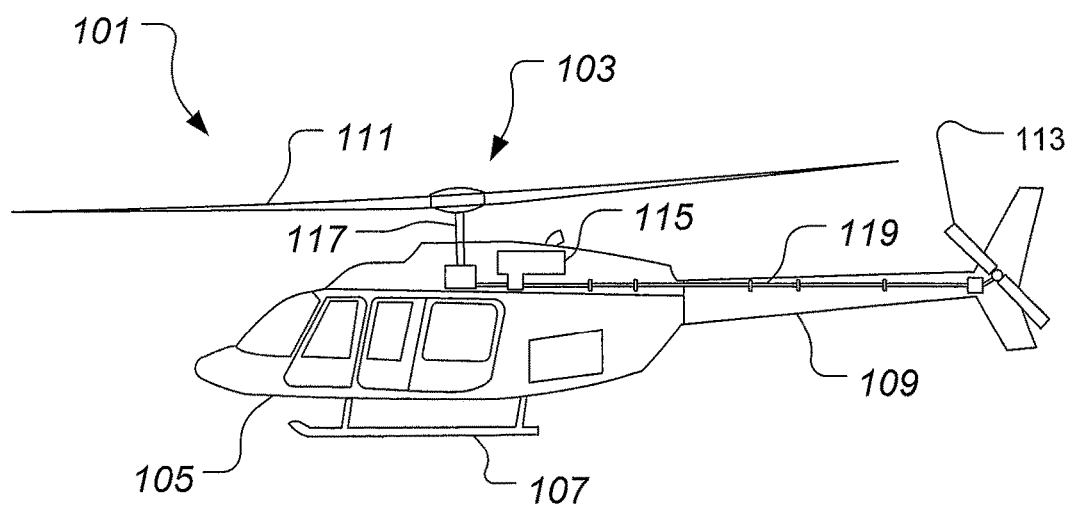
FIG. 1 is a plan view of a rotorcraft featuring a torsional anomaly detection system according to the preferred embodiment of the present application.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

A method and apparatus for determining failure diagnosis of drive systems of rotorcrafts through measuring the spectral characteristics of rotational oscillations and torsional oscillations and steady windup of a drive shaft. Mechanical anomalies of the drive system will alter the spectral characteristics of oscillations, both rotational and torsional, and steady windup as detected by a variable reluctance sensor in conjunction with a radial grating mounted on the drive shaft. The system produces a frequency spectrum based upon the output of the sensor and compares the frequency spectrum based upon the output of the sensor to a known good state and automatically detects oscillations that would indicate mechanical faults. The system provides a drive train and rotor system diagnostic tool to both the maintainer and the pilots.

The system is configured to measure two types of oscillations in a drive system. First, the system measures torsional oscillations and steady wind-up along the drive train. Second, the system measures rotational oscillations along the drive train. Both types of oscillations can be used by the system to detect and indicate faults along the drive train.

Referring to FIG. 1 in the drawings, a rotorcraft 101 is illustrated. Rotorcraft 101 has a rotor system 103 with a plurality of main rotor blades 111. Rotorcraft 101 further includes a fuselage 105, landing gear 107, a tail member 109, and tail rotor blades 113. An engine 115 supplies torque to a main rotor mast 117 and a tail rotor drive shaft 119, for the rotating of main rotor blades 111 and tail rotor blades 113, respectively. The pitch of each main rotor blade 111 can be selectively controlled in order to selectively control direction, thrust, and lift of rotorcraft 101. Further, the pitch of tail rotor blades 113 can be selectively controlled in order to selectively control yaw of rotorcraft 101.

Figure 2:
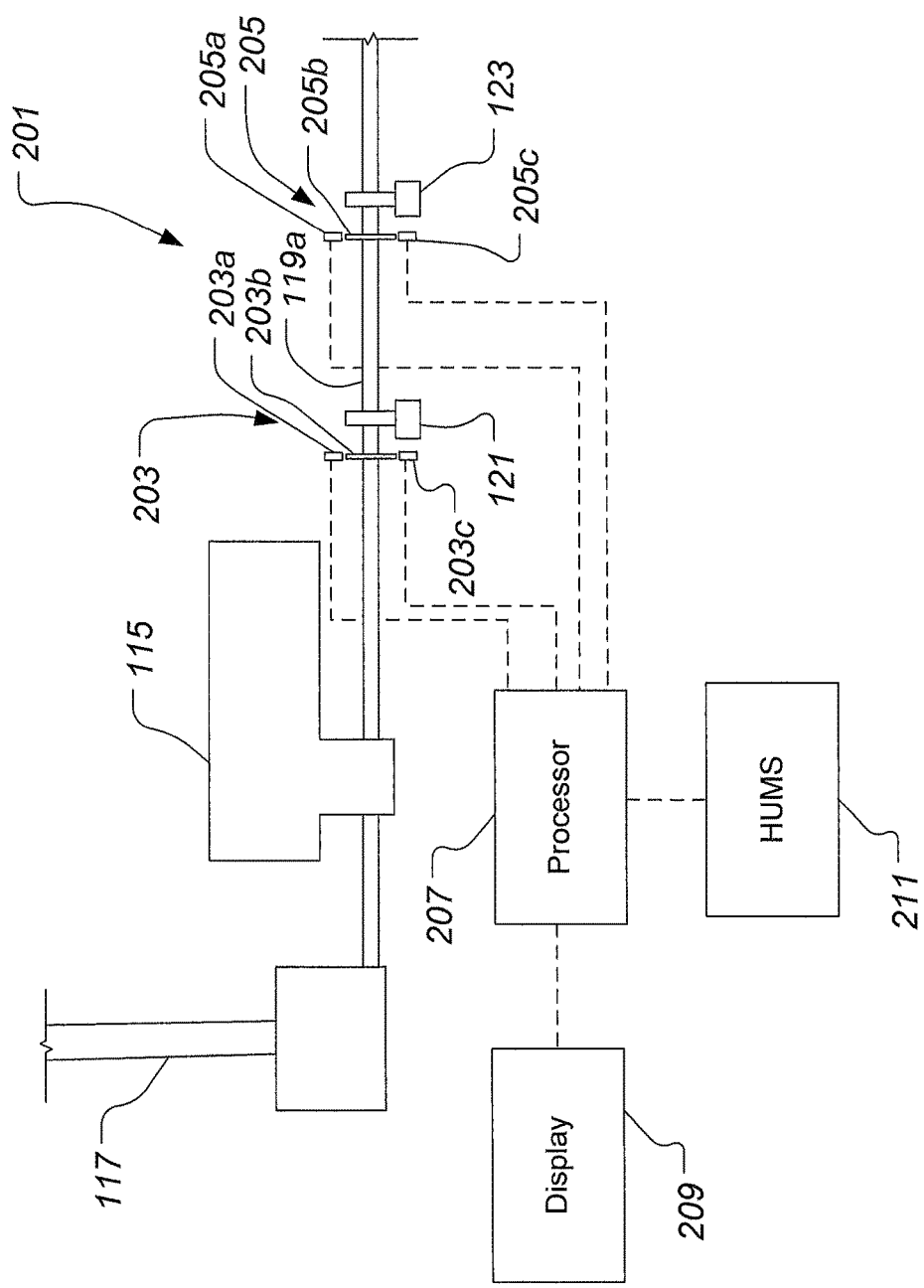
FIG. 2 is a graphical representation of a torsional anomaly detection system.

Referring now also to FIG. 2, a tail rotor drive shaft torque measuring sensor system 201 is illustrated in conjunction with the drive system of rotorcraft 101. Sensor system 201 is comprised of variable reluctance sensors aligned to rotating circular target having a plurality of teeth radially extending from the circular target.

Sensor system 201 utilizes a first hanger bearing 121 and a second hanger bearing 123 as stationary sensor mounting platforms, while rotating sensor components are adjacently located on tail rotor drive shaft 119. Preferably, the stationary sensor mounting positions are located adjacent the circular targets. Tail rotor drive shaft 119 can include a plurality of drive shaft segments, such as drive shaft segment 119a. Preferably, sensor system 201 is associated with a drive shaft segment, such as segment 119a, that is a forwardly located drive shaft segment. Sensor system 201 can include a first sensor assembly 203 associated with a forward portion of segment 119a, as well as a second sensor assembly 205 associated with an aft portion of segment 119a.

First sensor assembly 203 is comprised of a first forward sensor 203a and a forward grating 203b. Second forward sensor 203c may be utilized to increase the accuracy of the measurement, second forward sensor 203c is preferably located one hundred and eighty degree from the first forward sensor 203a and therefore they are opposite each other around the drive shaft. Using both the first forward sensor 203a and second forward sensor 203c in conjunction with forward grating 203b allows the system to compensate for translation of the grating 203b. The system is configured to measure rotational oscillations based upon first forward sensor 203a and the forward grating 203b.

Second sensor assembly 205 is comprised of a first aft sensor 205a and an aft grating 205b. Second aft sensor 205c may be utilized to increase the accuracy of the measurement, second aft sensor 205c is preferably located one hundred and eighty degree from the first aft sensor 205a and therefore they are opposite each other around the drive shaft. The system is configured to measure torsional oscillations and windup based upon first forward sensor 203a and the forward grating 203b in conjunction with first aft sensor 205a and the aft grating 205b. The system measures rotational oscillations with at least one of the sensors, and measures torsional oscillations with at least one forward sensor and one aft sensor. Additional sensors at the two gratings increase the accuracy of the system. Furthermore, additional gratings and sensors at other stations along the length of the drive shaft increases the accuracy of the system.

During operation, torque produced by engine 115 is transferred to tail rotor blades 113 via tail rotor drive shaft 119. The torque load on tail rotor drive shaft 119 can cause a variable torsional deflection. The torsional deflection can be referred to as a "wind-up" or "phase shift", for example. Further, the torsional deflection can be the result of torsional loading in a variety of operational conditions. Sensor system 201 is configured to detect the difference in "phase shift" between the torsional deflections measured from first sensor assembly 203 and second sensor assembly 205. A processor 207 is configured to process the measurement data from sensor system 201. In one embodiment, processor 207 communicates the measurement data to a pilot of rotorcraft 101 in a display 209. More specifically, display 209 can provide a visual indication of real-time torque values, as well as past torque values, experienced in tail rotor drive shaft 119. Alternatively, the processor 207 communicated the measured data to a health and usage monitoring system (HUMS) 211.

Figure 3:
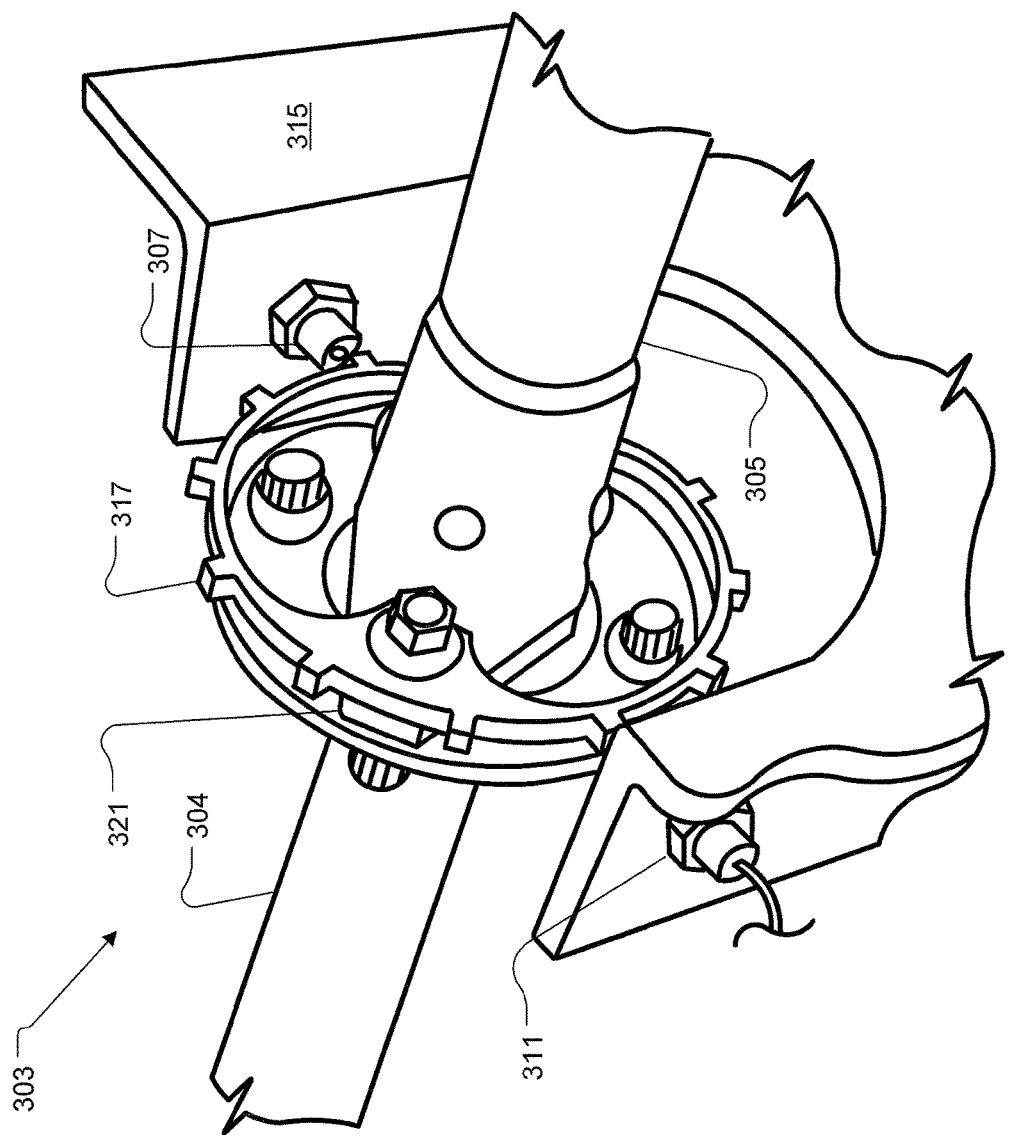
FIG. 3 is a perspective view of a sensor assembly according to the preferred embodiment of the present application.

Referring now also to FIG. 3, a perspective view of a first sensor assembly 303 is illustrated in conjunction with the drive system of rotorcraft 101. First sensor assembly 303 preferably located adjacent the first hanger bearing aft of the engine. First shaft 304 is located between the first hanger bearing and the engine. Second shaft 305 is located between the first hanger bearing and the second hanger bearing. However, it should be apparent that other hanger bearing locations are suitable for the sensor assembly. Measurement of steady and oscillatory rotation is possible with a single sensor assembly installation. Measurement of steady and oscillatory windup requires at least two locations of sensor assembly installations.

An algorithm stored in the processor compares measured windup, both steady and oscillatory, to a reference windup. Reference windup is determinable from either analytical models and/or empirical observations. Faults in the drive system and/or the rotor system, such as rubbing, looseness, or wear, will create a different windup. Additionally, transient conditions, such as a tail rotor bird strike, will also lead to different windups when compared to the reference windup.

First sensor assembly is comprised of a first sensor 307, a second sensor 311, a support bracket 315, and radially shaped grating 317. First sensor 307 and second sensor 311 are preferably variable reluctance sensors or Hall effect sensors that reacts to grating 317 rotating in close proximity to the sensors. First sensor 307 and second sensor 311 are located 180 degrees apart from each other mounted to support bracket 315. Having two sensors in a sensor assembly improves accuracy, but a single sensor is sufficient in most locations. Support bracket 315 typically mounts to the airframe of the aircraft around the hanger bearing support Alternatively bracket 315 mounts to the hanger bearing support directly. First sensor 307 and second sensor 311 are axially adjusted till the tip of the sensors is typically 1-2 mm away from an outer edge of the radial grating 317. Radial grating 317 is typically ferrous and is mounted to the drive shaft coupling 321. Drive shaft coupling 321 couples the first drive shaft 304 and the second drive shaft 305.

Figure 4:
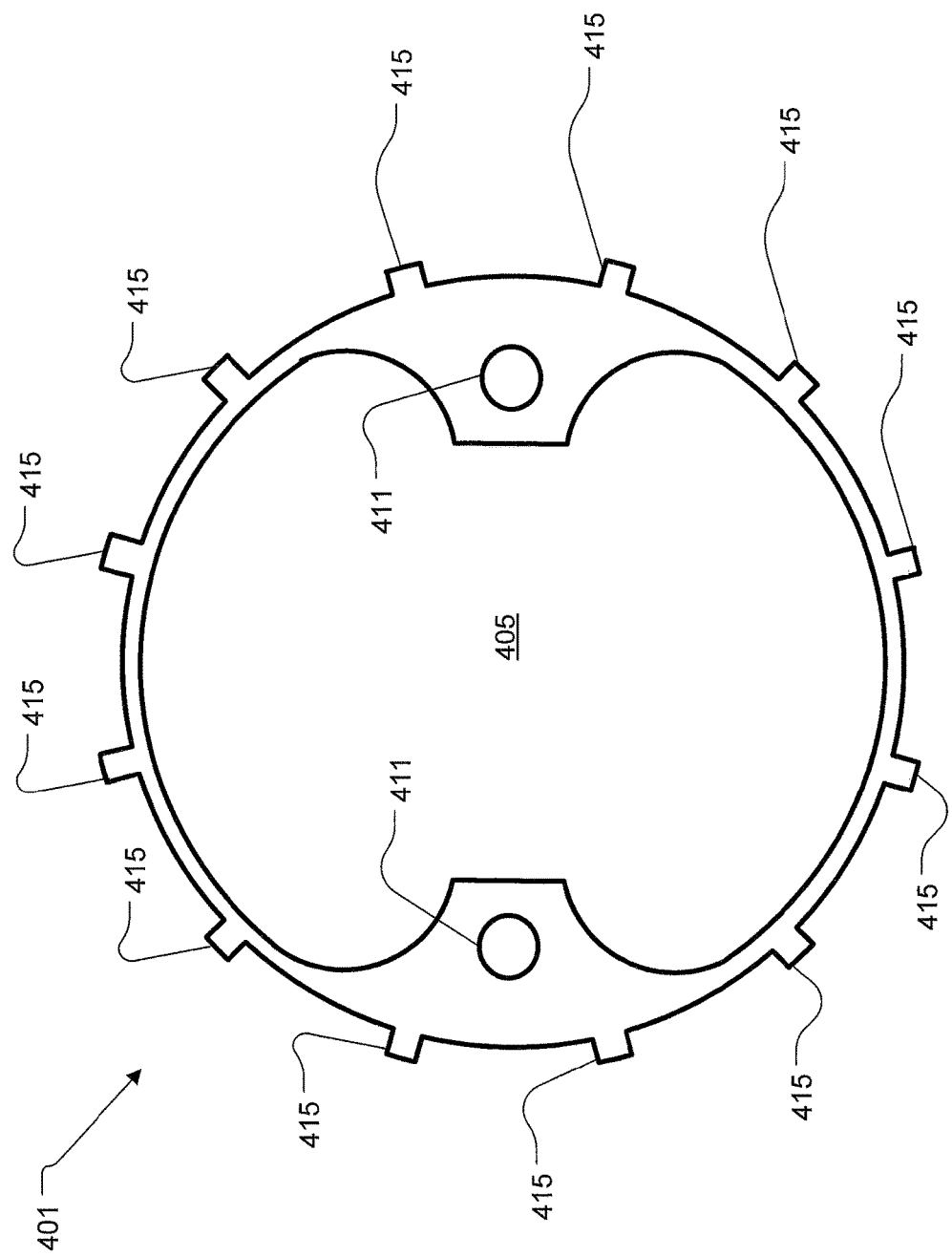
FIG. 4 is a plan view of a grating according to the preferred embodiment of the present application

Referring now also to FIG. 4, a plan view of a radial grating 401 is illustrated. Radial grating 401 includes a center aperture 405 configured for allowing the drive shaft coupling between the first drive shaft and the second drive shaft to pass through the radial grating. Radial grating 401 has two holes 411 that allow the radial grating to be mounted to the coupling. Radially extending or longitudinally extending from an outer edge of the radial grating are a dozen teeth 415 protrusions arrayed around a circumference of the grating. Other numbers of teeth 415 are contemplated. Since the teeth 415 protrude from the grating 401, the sensors 307 and 311 can detect the teeth and not the rest of the grating 401. Since the grating 401 is rigidly coupled to the coupling and to the drive shaft, as the shaft spins so does the grating 401. As the grating 401 spins in relation to the sensors, a pattern emerges from the output of the sensors corresponding to the teeth passing the sensors. As sensors are placed along the length of a drive train, such as indicated in FIG. 2, the windup and torque of the drive shaft can be determined along the length of the drive train. While grating 401 has been described as a bolt on addition to existing drive train couplings, it should be apparent that the grating 401 can be made integral to the coupling to allow the grating to be the drive shaft to drive shaft coupler. Thereby reducing the number of parts in a high speed critical area.

Figure 5A:
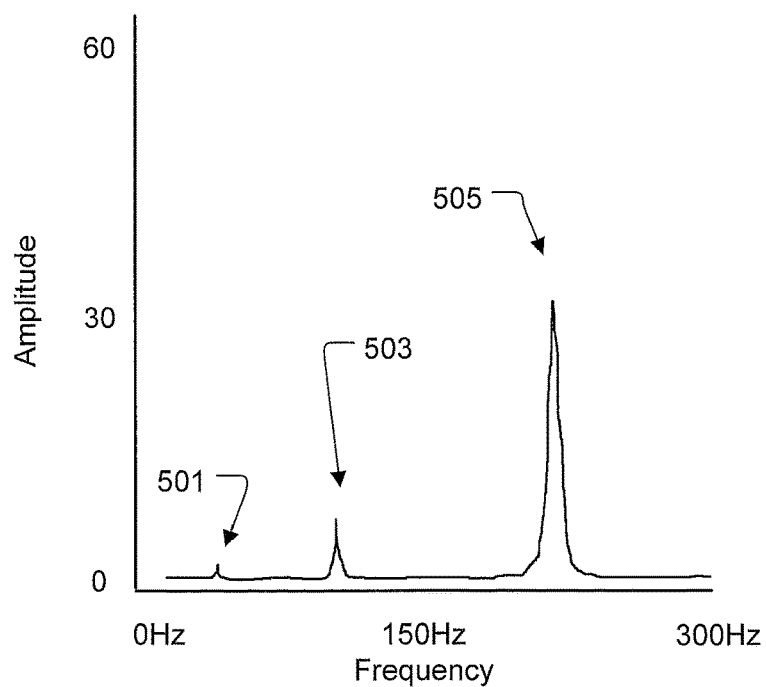
FIG. 5a is a graph of an oscillatory torque without a fault.
Figure 5B:
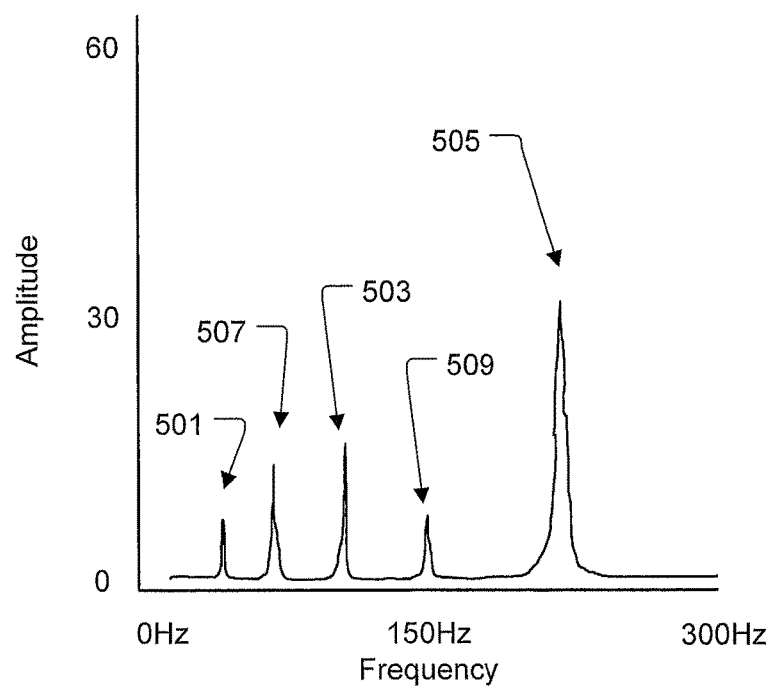
FIG. 5b is a graph of an oscillatory torque with a fault.

Referring now also to FIG. 5a, a graph of an oscillatory torque is illustrated. Amplitude, such as in-lb's, of the response versus frequency is graphed of an oscillatory torque along a drive shaft in an un-faulted state. First spike 501, second spike 503, and third spike 505 indicate to the system no faults. Referring now also to FIG. 5b, a graph of an oscillatory torque, featuring a fault, is illustrated. Amplitude of the response versus frequency is graphed of an oscillatory torque along a drive shaft in a faulted state. Typically a fault, such as an oil cooler rubbing, generates additional spectral content such as fourth spike 507 and fifth spike 509. The system detects the fourth spike 507 and the fifth spike 509 and indicates that the oil cooler may be rubbing. The processor 207 uses a look up table of spectral data to compare measured data while detecting faults. The look up table of spectral data is comprised of faults versus spectral data. For example, the look up table indicates that spikes like 507 and 509 at a certain frequency and amplitude indicate the fault of an oil cooler rubbing. The data inside the lookup table is determinable from either analytical models and/or empirical observations. Additional signal processing and statistical feature extraction techniques, such as those used for fault detection in accelerometer-based health monitoring systems, could be applied to torsional and rotational spectra as well. These extracted features may be compared to fixed thresholds or trended over time to detect changes in behavior that may indicate a fault. While oscillatory torque is shown in FIGS. 5a and 5b, oscillatory rotational amplitude and other signals described above could be used in a similar manner to detect faults in drive train systems.

The system of the present application provides significant advantages, including: (1) providing diagnostic and fault detection information about the drive train, (2) measures windup and torque of the drive shaft, (3) does not require the use of wireless high frequency rotating instrumentation, and (4) does not use accelerometers.

It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A system for detecting torsional anomalies of an aircraft during a failure, the aircraft having a first drive shaft and a second drive shaft, the system comprising:
   a grating, having;
      a plurality of teeth extending from the grating, the grating coupled to a first interconnection between the first drive shaft and the second drive shaft;
   a support bracket in close proximity to the first interconnection and positioned about the grating;
   a first sensor mounted on the support bracket;
   a second sensor mounted on the support bracket; and
   a processor comprising;
      a lookup table comprising;
         a plurality of spectral data of predetermined faults;
      the processor for comparing a spectral analysis of an output of the first sensor and second sensor to the lookup table;
   wherein the first sensor and second sensor are configured to detect the teeth of the grating.

2. The system according to claim 1, wherein the second sensor is rotated 180 degrees relative to the first sensor.

3. The system according to claim 1, wherein the first sensor is a variable reluctance sensor.

4. The system according to claim 1, wherein the grating comprises:
   a center aperture;
   wherein the center aperture is configured to allow the first interconnection to pass through the grating.

5. The system according to claim 1, further comprising:
   a display;
   wherein the processor provides a real-time indication of torque values of the first drive shaft on the display.

6. The system according to claim 1, wherein the plurality of teeth around the grating are equally spaced around the grating.

7. A system for detecting torsional anomalies of an aircraft during a failure, the aircraft having a first drive shaft and a second drive shaft, the system comprising:
   a first sensor assembly having;
      a forward support bracket;
      a first forward sensor;
      a second forward sensor; and
      a first grating, having;
         a plurality of teeth radially extending from the first grating;
      the first and second forward sensors being mounted on the forward support bracket and positioned about the first grating;
   a second sensor assembly having;
      an aft support bracket;
      a first aft sensor;
      a second aft sensor; and
      a second grating;
      the first and second aft sensors being mounted on the aft support bracket and positioned about the second grating; and
   a processor having;
      a lookup table;
   wherein the lookup table comprises a plurality of spectral data of predetermined faults, the processor configured for analyzing a spectral analysis of an outputs of the first and second forward sensors and a spectral analysis of an outputs of the first and second aft sensors;
   wherein the first and second forward sensors are configured to detect the teeth of the first grating.

8. The system according to claim 7, wherein the plurality of teeth around the first grating are equally spaced around the first grating.

9. The system according to claim 7, further comprising:
   a display;
   wherein the processor provides a real-time indication of torque values of the first drive shaft on the display.

10. The system according to claim 7, wherein the first grating comprises:
    a center aperture configured for passing the first drive shaft through the center aperture.

11. The system according to claim 7, wherein the second forward sensor is rotated 180 degrees relative to the first forward sensor.

12. The system according to claim 7, wherein the first forward sensor is a variable reluctance sensor.

13. The system according to claim 7, wherein the forward support bracket is positioned about the first drive shaft.

14. The system according to claim 7, wherein the forward support bracket is mounted to a hanger bearing assembly.

* * * * *